United States Patent
Benjamin et al.

(10) Patent No.: US 12,002,493 B2
(45) Date of Patent: Jun. 4, 2024

(54) AUTOMATIC MEDIA CONTENT LAYERING SYSTEM

(71) Applicant: Spooler Media, Inc., Bend, OR (US)

(72) Inventors: Daniel Benjamin, Austin, TX (US); Henry Blodget, Brooklyn, NY (US); James O. Boggs, Bend, OR (US); Andrew Bowers, Santa Barbara, CA (US); Kerry Donahue, New York, NY (US)

(73) Assignee: Spooler Media, Inc., Bend, OR (US)

( * ) Notice: Subject to any disclaimer, the term of this patent is extended or adjusted under 35 U.S.C. 154(b) by 0 days.

(21) Appl. No.: 18/176,417

(22) Filed: Feb. 28, 2023

(65) Prior Publication Data

US 2023/0274766 A1    Aug. 31, 2023

Related U.S. Application Data

(60) Provisional application No. 63/314,952, filed on Feb. 28, 2022.

(51) Int. Cl.
  *G11B 27/036*    (2006.01)
  *G11B 27/32*    (2006.01)

(52) U.S. Cl.
  CPC .......... *G11B 27/036* (2013.01); *G11B 27/322* (2013.01)

(58) Field of Classification Search
  None
  See application file for complete search history.

(56) References Cited

U.S. PATENT DOCUMENTS

| | | | | |
|---|---|---|---|---|
| 5,625,570 | A * | 4/1997 | Vizireanu | G11B 27/36 |
| 2006/0167956 | A1* | 7/2006 | Chasen | H04L 67/06 |
| | | | | 707/999.203 |
| 2012/0251082 | A1* | 10/2012 | De Vos | H04N 9/8211 |
| | | | | 386/E5.028 |
| 2022/0129238 | A1* | 4/2022 | Gossain | G06F 1/3209 |
| 2023/0217060 | A1* | 7/2023 | Cosmo | H04N 21/43072 |
| | | | | 725/87 |
| 2023/0274766 | A1* | 8/2023 | Benjamin | G11B 27/322 |
| | | | | 360/13 |

* cited by examiner

*Primary Examiner* — Peter Vincent Agustin
(74) *Attorney, Agent, or Firm* — Pillsbury Winthrop Shaw Pittman, LLP

(57) ABSTRACT

Provided are mechanisms that allow automatic media content layering. The systems and methods obtain a media content list that includes a plurality of different types of media content segment entries. Media content tracks are determined from the plurality of media content segment entries and are based on the type of those entries. Media content track features are determined from the media content segment entries where those features are used to adjust the media content tracks, layering of multiple media content tracks, adjusting media content segments that make up the media content tracks or other features. A media content layered object is then generated based on the media content track features and the media content tracks. An action, such as storage, may be performed on the generated media content layered object.

20 Claims, 10 Drawing Sheets

AUTOMATIC MEDIA CONTENT LAYERING SYSTEM

CROSS-REFERENCE TO RELATED APPLICATIONS

The present patent application claims the benefit of U.S. Provisional Patent Application No. 63/314,952, having the same title, filed on 28 Feb. 2022. The entire content of each aforementioned patent filing is hereby incorporated by reference.

BACKGROUND

1. Field

The present disclosure relates generally to computer-implemented system and method for automatic audio content layering.

2. Description of the Related Art

Internet distribution of media content, such as audio content, video content, visual content, audio video content, or other media content, continues to increase every year. For example, studies have reported a 300% increase in podcast consumption over the previous decade, with over 40% of the U.S. population reporting to have listened to a podcast in the past month. And numerous video streaming and local caching services have disrupted conventional cable, satellite, and movie businesses. Also, more and more people are receiving news and information from the Internet via their smartphones and computers. Even conventional conduits of media content, such as televisions, may receive media content through the Internet that is provided on-demand or cached locally in advance for the user.

SUMMARY

The following is a non-exhaustive listing of some aspects of the present techniques. These and other aspects are described in the following disclosure.

Some aspects include a method automatic audio layering in media content including obtaining, by a computer system, a media content list that includes at least one first type audio content segment entry and at least one second type audio content segment entry, wherein each of the at least one first type audio content segment entries is associated with a respective first type audio content segment and each of the at least one second type audio content segment entries is associated with a respective second type audio content segment; determining, by the computer system, a first audio content track based on the at least one first type audio content segment entry and a second audio content track based on the at least one second type audio content segment entry; determining, by the computer system, media content track features of the first audio content track and the second audio content track based on an order of the at least one first type audio content segment entry and the at least one second type audio content segment entry in the media content list; generating, by the computer system, a media content layered object based on the media content track features and the first audio content track and the second audio content track, wherein the media content layered object includes the first audio content track and the second audio content track such that when the media content layered object is played, at least a portion of the first audio content track is played concurrently with the second audio content track; and storing, by the computer system, the media content layered object in a storage system.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
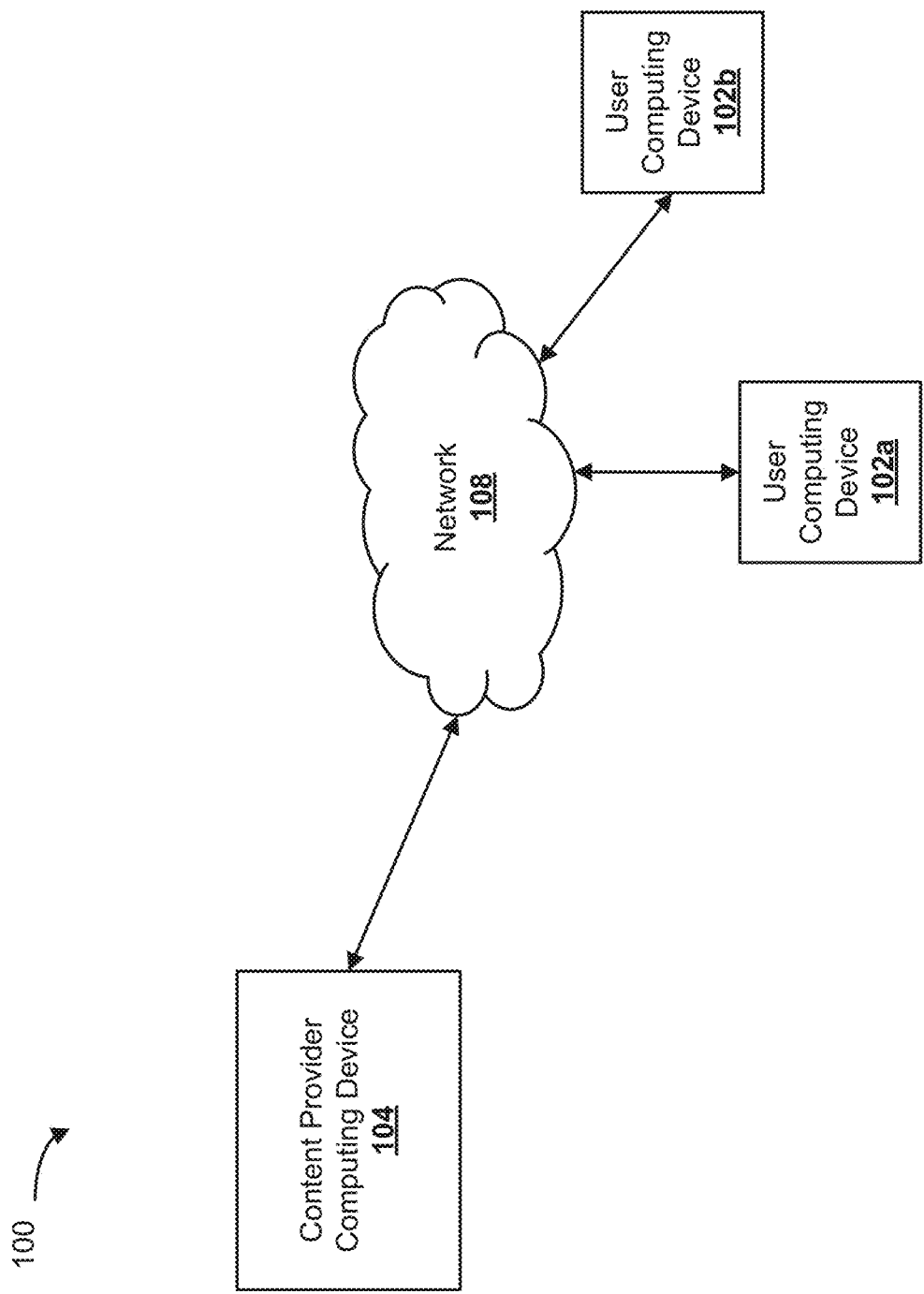
FIG. 1 is a block diagram illustrating an example of a media content layering system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of digital content-creation tooling, data compression, and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

For Internet-based media content providers, managing and distributing digital media content may be difficult. For example, evolving media content (media content that periodically changes (e.g., news)) may be difficult to track and provide updates to the developing story. Also, this content may be manipulated or faked deliberately or by accident when editing the content, which results in different context than what the original author intended. More specifically, many machine learning approaches to detecting deep fakes suffer from adversarial attacks. Furthermore, segmenting and composing digital content interferes with many compression algorithms near the boundary of segments' and normalization algorithms' performance near the boundary. Further still, media content layering tools, such as audio content layering tools, that are used to combine a plurality of tracks that are played simultaneously is often cumbersome when timing tracks. That said, embodiments are not limited to systems that address all of these problems, as various independently useful inventive techniques are described herein, and some embodiments may address only a subset of these problems or other problems that would be evident to one of ordinary skill in the art reading the present disclosure, none of which is to suggest that any other description is limiting.

Some embodiments provide a media content layering system. Some embodiments may provide tools for a media content administrator to generate and manage layering of a plurality of media content tracks (e.g., audio content, video content, visual content) within a media content object (a term which should not be read to suggest that the present techniques are limited to object-oriented programming languages, as other types of data structures can also serve as objects in the present sense). The media content object may include a plurality of media content segments. The media content segments may be selected from a media content segment library or generated in real-time and, as such, be used in a plurality of media content objects. In some embodiments, the media content segment library may include a plurality of media content track libraries, where some of the media content track libraries are associated with one or a plurality of media contract tracks in a media content layered object. In some embodiments, some media content track libraries may be associated with the same track. The systems and methods of the present disclosure can concatenate segments in each track, layer the tracks for simultaneous play, and provide automatic timing so that the layered media content tracks seamlessly start and stop. The resulting media content object may be provided to a user at a user computing device for consumption. In some embodiments, each of the segments in a track may undergo a version change and the system may perform a method of media versioning that is described in application Ser. No. 17/683,038, titled CONTENT VERSIONING SYSTEM, and filed Feb. 28, 2022, which is incorporated by reference in its entirety.

FIG. 1 depicts a block diagram of an example of an automatic media content layering system 100, consistent with some embodiments. In some embodiments, the automatic media content layering system 100 may include one or more user computing devices (e.g., a user computing device 102a and a user computing device 102b) and a content provider computing device 104. The user computing devices 102a and 102b and the content provider computing device 104 may be in communication with each other over a network 108. In various embodiments, the user computing device 102a may be associated with a first user and the user computing device 102b may be associated with a second user (e.g., in memory of the automatic media content layering system 100 in virtue of user profiles). These various components may be implemented with computing devices like that shown in FIG. 7.

In some embodiments, the user computing devices 102a and 102b may be implemented using various combinations of hardware or software configured for wired or wireless communication over the network 108. For example, the user computing devices 102a and 102b may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HIVID), a watch, an eyeglass projection screen, an autonomous/semi-autonomous device, a vehicle, a user badge, or other user computing devices. In some embodiments, the user computing devices 102a and 102b may include various combinations of hardware or software having one or more processors and capable of reading instructions stored on a tangible non-transitory machine-readable medium for execution by the one or more processors. Consistent with some embodiments, the user computing devices 102a and 102b include a machine-readable medium, such as a memory that includes instructions for execution by one or more processors for causing the user computing devices 102a and 102b to perform specific tasks. In some embodiments, the instructions may be executed by the one or more processors in response to interaction by the user. Two user computing devices are shown, but commercial implementations are expected to include more than one million, e.g., more than 10 million, geographically distributed over North America or the world.

The user computing devices 102a and 102b may include a communication system having one or more transceivers to communicate with other user computing devices or the content provider computing device 104. Accordingly, and as disclosed in further detail below, the user computing devices 102a and 102b may be in communication with systems directly or indirectly. As used herein, the phrase "in communication," and variants thereof, is not limited to direct communication or continuous communication and can include indirect communication through one or more intermediary components or selective communication at periodic or aperiodic intervals, as well as one-time events.

For example, the user computing devices 102a and 102b in the automatic media content layering system 100 of FIG. 1 may include first (e.g., relatively long-range) transceiver to permit the user computing devices 102a and 102b to communicate with the network 108 via a communication channel. In various embodiments, the network 108 may be implemented as a single network or a combination of multiple networks. For example, in various embodiments, the network 108 may include the Internet or one or more intranets, landline networks, wireless networks, or other appropriate types of communication networks. In another example, the network 108 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth generation (5G) wireless network or any subsequent generations. In some examples, the network 108 may be additionally or alternatively be implemented by a variety of communication networks, such as, but not limited to (which is not to suggest that other lists are limiting), a satellite communication network, a microwave radio network, or other communication networks.

The user computing devices 102a and 102b additionally may include second (e.g., short-range relative to the range of the first transceiver) transceiver to permit the user computing device 102a and 102b to communicate with each other or other user computing devices via a direct communication channel. Such second transceivers may be implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceivers, and other transceivers that are configured to allow the user computing devices 102a and 102b to communicate with each other or other user computing devices via an ad-hoc or other wireless network.

The automatic media content layering system 100 may also include or may be in connection with the content provider computing device 104. For example, the content provider computing device 104 may include one or more server devices, storage systems, cloud computing systems, or other computing devices (e.g., desktop computing device, laptop/notebook computing device, tablet computing device, mobile phone, etc.). In various embodiments, content provider computing device 104 may also include various combinations of hardware or software having one or more processors and capable of reading instructions stored on a tangible non-transitory machine-readable medium for execution by the one or more processors. Consistent with some embodiments, the content provider computing device 104 includes a machine-readable medium, such as a memory (not shown) that includes instructions for execution by one or more processors (not shown) for causing the content provider computing device 104 to perform specific tasks. In some embodiments, the instructions may be executed by the one or more processors in response to interaction by the user. The content provider computing device 104 may also be maintained by an entity with which sensitive credentials and information may be exchanged with the user computing devices 102a and 102b. The content provider computing device 104 may further be one or more servers that host applications for the user computing devices 102a and 102b. The content provider computing device 104 may be more generally a web site, an online content manager, a service provider, or other entity who provides media content (e.g., video content, audio content, visual content, text content, audiovisual content, haptic content, or any other media content that would be apparent to one of skill in the art in possession of the present disclosure) or services to the user. The content provider computing device 104 may include various applications and may also be in communication with one or more external databases, that may provide additional information that may be used by the content provider computing device 104.

Figure 2:
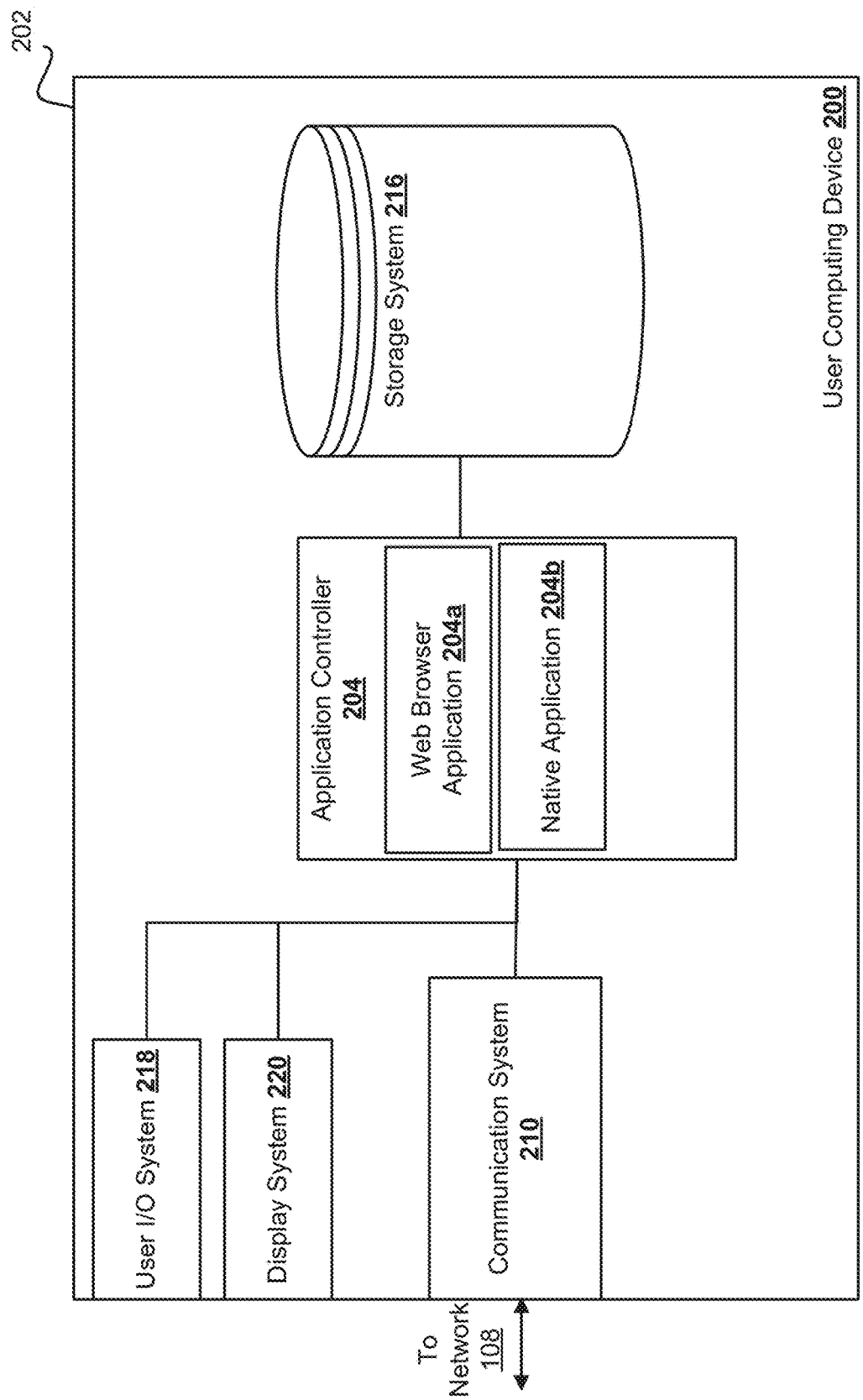
FIG. 2 is a block diagram illustrating an example of a user computing device of the media content layering system of FIG. 1, in accordance with some embodiments of the present disclosure.

FIG. 2 illustrates an embodiment of a user computing device 200 that may be the user computing device 102a or 102b discussed above with reference to FIG. 1. In the illustrated embodiment, the user computing device 200 includes a chassis 202 that houses the components of the user computing device 200. Several of these components are illustrated in FIG. 2. For example, the chassis 202 may house a processing system and a non-transitory memory system that includes instructions that, when executed by the processing system, cause the processing system to provide an application controller 204 that is configured to perform the functions of the application controller or the user computing devices discussed below. In the specific example illustrated in FIG. 2, the application controller 204 is configured to provide one or more of a web browser application 204a or a native application 204b.

The chassis 202 may further house a communication system 210 that is coupled to the application controller 204 (e.g., via a coupling between the communication system 210 and the processing system). The communication system 210 may include software or instructions that are stored on a computer-readable medium and that allow the user computing device 200 to send and receive information through the communication networks discussed above. For example, the communication system 210 may include a communication interface to provide for communications through the network 108 as detailed above (e.g., first (e.g., long-range) transceiver). In an embodiment, the communication interface may include a wireless antenna that is configured to provide communications with IEEE 802.11 protocols (Wi-Fi), cellular communications, satellite communications, other microwave radio communications or communications. The communication system 210 may also include a communication interface (e.g., the second (e.g., short-range) transceiver) that is configured to provide direct communication with other user computing devices, sensors, storage devices, beacons, and other devices included in the securitization system discussed above with respect to FIG. 1. For example, the communication interface may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), or other wireless communication protocols that allow for direct communication between devices.

The chassis 202 may house a storage device (not illustrated) that provides a storage system 216 that is coupled to the application controller 204 through the processing system. The storage system 216 may be configured to store data, applications, or instructions described in further detail below and used to perform the functions described herein. In various embodiments, the chassis 202 also houses a user input/output (I/O) system 218 that is coupled to the application controller 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, or any other input subsystem. The chassis 202 also houses a display system 220 that is coupled to the application controller 204 (e.g., via a coupling between the processing system and the display system 220) and may be included in the user I/O system 218. In some embodiments, the display system 220 may be provided by a display device that is integrated into the user computing device 200 and that includes a display screen (e.g., a display screen on a laptop/notebook computing device, a tablet computing device, a mobile phone, or wearable device), or by a display device that is coupled directly to the user computing device 200 (e.g., a display device coupled to a desktop computing device by a cabled or wireless connection).

Figure 3:
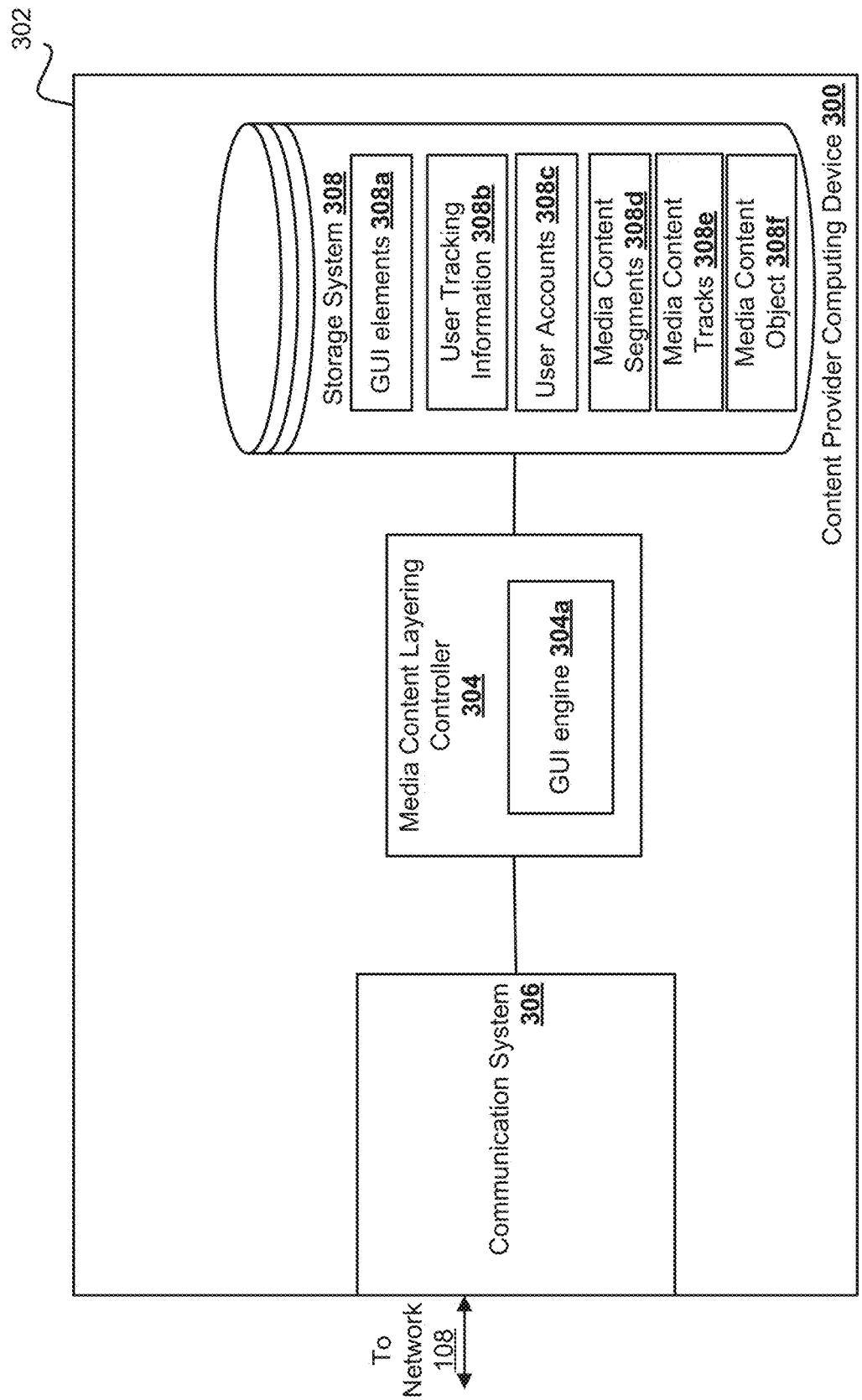
FIG. 3 is a block diagram illustrating an example of a service provider server computing device of the media content layering system of FIG. 1, in accordance with some embodiments of the present disclosure.

FIG. 3 depicts an embodiment of a content provider computing device 300, which may be the content provider computing device 104 discussed above with reference to FIG. 1. In the illustrated embodiment, the content provider computing device 300 includes a chassis 302 that houses the components of the content provider computing device 300, only some of which are illustrated in FIG. 3. For example, the chassis 302 may house a processing system (not illustrated) and a non-transitory memory system (not illustrated) that includes instructions that, when executed by the processing system, cause the processing system to provide a media content layering controller 304 that is configured to perform the functions of the media content layering controller or content provider server devices discussed below. The media content layering controller 304 may include a graphical user interface (GUI) engine 304a used to generate GUIs and GUI elements discussed below.

The chassis 302 may further house a communication system 306 that is coupled to the media content layering controller 304 (e.g., via a coupling between the communication system 306 and the processing system) and that is configured to provide for communication through the network 108 of FIG. 1 as detailed below. The communication system 306 may allow the content provider computing device 300 to send and receive information over the network 108 of FIG. 1. The chassis 302 may also house a storage device (not illustrated) that provides a storage system 308 that is coupled to the media content layering controller 304 through the processing system. The storage system 308 may include a GUI elements library 308a, a user tracking information library 308b, a user accounts library 308c, a media content segments library 308d, a media content tracks library 308e, a media content object library 308f, or other data or instructions to complete the functionality discussed herein. In various embodiments, the storage system 308 may be provided on the content provider computing device 300 or on a database accessible via the communication system 306.

Figure 4:
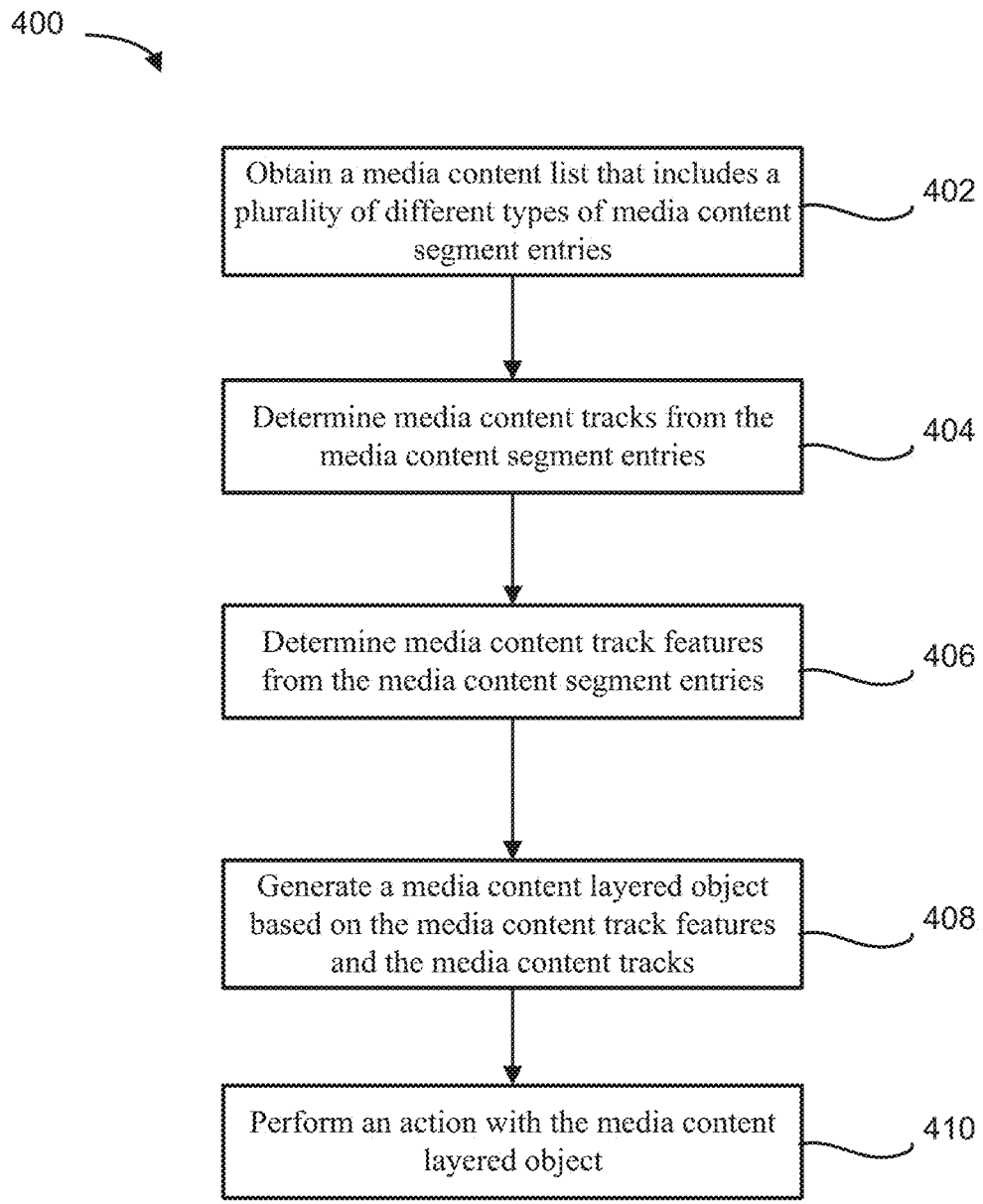
FIG. 4 is a flow diagram illustrating an example of a method of the automatic media content layering, in accordance with some embodiments of the present disclosure.

FIG. 4 depicts an embodiment of a method 400 of automatic media content layering, which in some embodiments may be implemented with the components of FIGS. 1, 2, and 3 discussed above. As discussed below, some embodiments make technological improvements to Internet-based media content platforms and GUIs used on those platforms. Some embodiments provide for automatic media content layering. The systems and methods also reduce memory, processing, and network resources by segmenting media content and providing automatic media content layering that automatically adjusts track length of certain tracks based on a length of another track that is associated with the track. One of skill in the art in possession of the present disclosure will recognize that these Internet-centric and digital content-based problems, along with other Internet-centric and digital content-based problems, are solved or mitigated by some of these embodiments. Again, though, embodiments are not limited to approaches that address these problems, as various other problems may be addressed by other aspects of the present disclosure, which is not to suggest that any other description is limiting.

The method 400 is described as being performed by the media content layering controller 304 included on the content provider computing device 104/300. The media content layering controller 304 may be included on a decentralized content distribution system, such as, but not limited to, BitTorrent, Filecoin or Stori. Furthermore, it is contemplated that the user computing device 200 may include some or all the functionality of the media content layering controller 304. As such, some or all of the steps of the method 400 may be performed by the user computing device 200 and still fall under the scope of the present disclosure. As mentioned above, the content provider computing device 104/300 may include one or more processors and/or one or more servers, and thus the method 400 may be distributed across the those one or more processors and/or the one or more servers.

The method 400 may begin at block 402 where a media content list is obtained that includes a plurality of different types of media content segment entries. For example, the media content list may include at least one first type media content segment entry and at least one second type media content segment entry. Each of the first type media content segment entries is associated with a respective first type media content segment, and each of the at least one second type media content segment entries is associated with a respective second type media content segment. In an embodiment, at block 402, the media content layering controller 304 may obtain a media content list that includes at least two different types of media content segment entries. The type of media content segment associated with media content segment entries may be associated with a particular media content track. For example, a first type of media content segment may be associated with a first track while a second type of media content segment may be associated with a second media content track. The media content segments, when created, may be tagged or otherwise associated with a media content track. However, it is contemplated that the media content segments may be editable such that media content segments may be associated with a different track when a user creates the media content list.

Prior to obtaining the media content list, media content segments may be generated and stored in the media content segments library 308d. Each media content segment may be associated with a sub-library, which may be indicative of a media content track to which that media content segment is to be assigned. For example, the media content segment sub-libraries may include a content portion sub-library, a stinger sub-library, a loop sub-library, a theme sub-library, a silence sub-library or any other sub-library that would be apparent to one of skill in the art in possession of the present disclosure.

A user of the user computing device 102a or the user computing device 102b via the application controller 204 may access the GUI engine 304a to access a media content list GUI used to create the media content list. For example, the media content list GUI may include selectable media content segment GUI elements that the user may select to be included in the media content list. For example, the user may drag and drop selectable media content segment GUI elements into the media content list GUI. The GUI may be configured such that the user may be able to manipulate the selectable media content segment GUI elements in the media content list to change an order of the selectable media content segment GUI elements in the media content list GUI. The order of the selectable media content segment GUI elements, the type of media content segment, the number of media content segments, or other factors may influence the media content track generation, duration of media content segments within a track, or the layering of the media content tracks when forming the media content layered object that includes a plurality of layered media content tracks.

For example, and with reference to FIGS. 5A, 5B, 5C, and 5D, a GUI 500*a*, a GUI 500*b*, a GUI 500*c*, and a GUI 500*d*, respectively, are displayed on a display device 502 included in the display system 220 of FIG. 2. The GUIs 500*a-d* may be provided by the GUI engine 304*a* and illustrate an example of the media content list GUI and the selectable media content segment GUI elements used by a user to build a media content list. The GUIs 500*a*, 500*b*, 500*c*, and 500*d* may include a plurality of media content segment sub-libraries. A media content segment sub-library may be associated with one or more media content segments from the media content segment library 308*d*. As illustrated in FIGS. 5A-5D, the GUIs 500*a*-500*d* may include a content portion sub-library 504, a stinger sub-library 506, a loops sub-library 508, a themes sub-library 510, a silences sub-library 512, or any other media content segment sub-library that would be apparent to one of skill in the art in possession of the present disclosure.

Figure 5A:
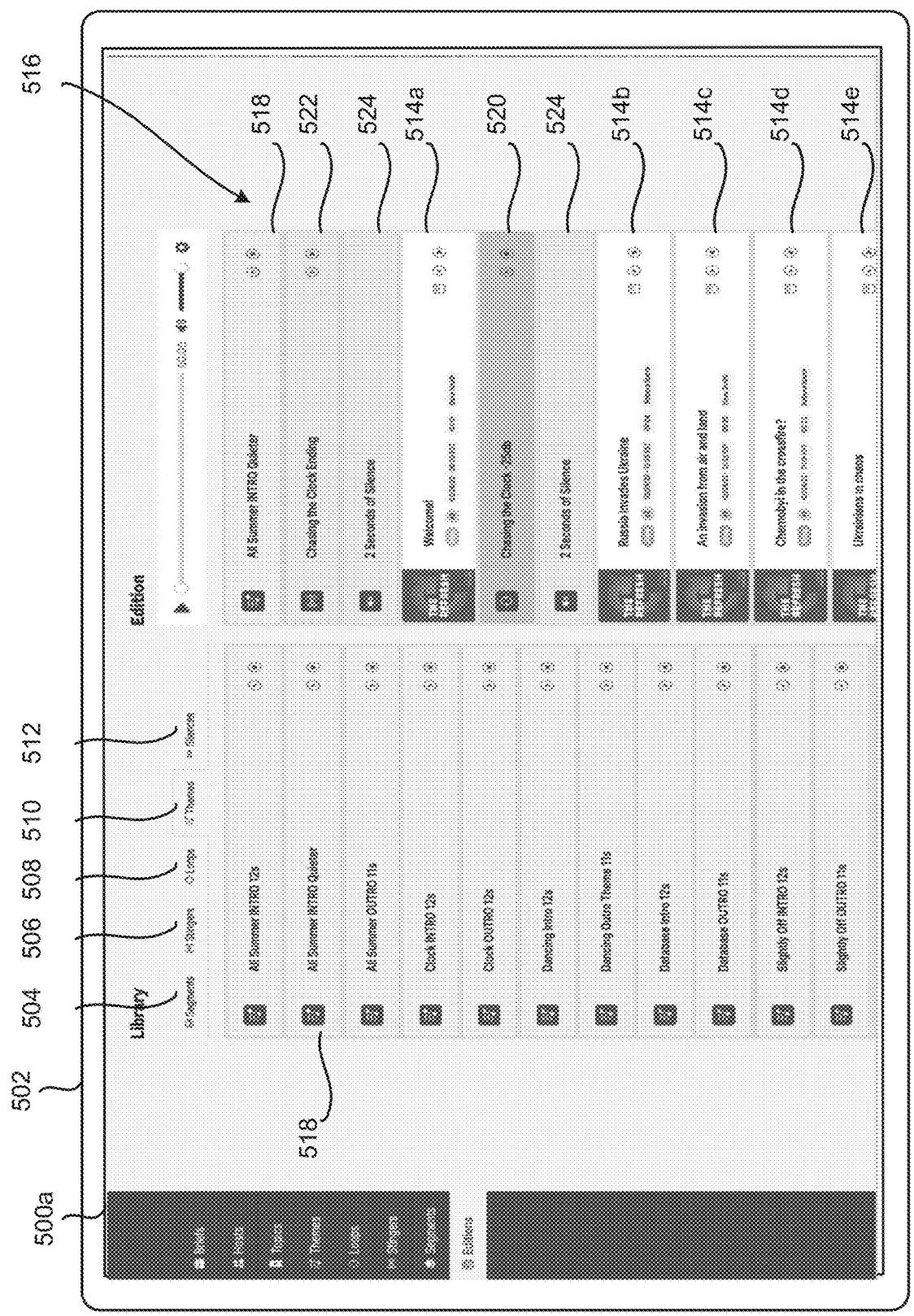
FIG. 5A illustrates a graphical user interface (GUI) during some embodiments of a method of automatic media content layering, in accordance with some embodiments of the present disclosure.

The content portion sub-library 504 may include one or more media content segment GUI elements such as content portion media content segment GUI elements 514*a*-514*e* in FIG. 5A. The content portion media content segment GUI elements 514*a*-514*e* may be provided by media content administrator. For example, the user computing device 102*a* may create and provide the plurality of media content segments to the content provider computing device 104/300 via the web browser application 204*a* or the native application 204*b* and the network 108. The media content layering controller 304 may provide a website via the web browser application 204*a* or provide the native application 204*b*. The media content administrator may create, using software tools provided by the media content layering controller 304, a media content list that includes the one or more of the plurality of media content segments. For example, the media content layering controller 304 may generate a media content list GUI 516 using the GUI engine 304*a*. The GUI engine 304*a* may generate or obtain GUI elements 308*a* that are based on media content segment information associated with the media content segment. The media content list GUI may be provided to the user computing device 102*a* via the network 108 and displayed on the display system 220 via the web browser application 204*a* and the native application 204*b*. The media content list GUI may include media content segment GUI elements (e.g., content portion media content segment GUI elements 514*a*-514*e*) for each media content segment. The media content administrator may add the media content segments to a media content list by selecting or moving (e.g., a drag and drop action) a media content segment GUI element into a media content list GUI element 516 (e.g., the editions column of FIGS. 5A-5D). One or more media content segment GUI elements may be added to the media content list GUI element 516. When provided in the media content list GUI element 516, the media content administrator may order the media content segments GUI elements in any order.

Figure 5B:
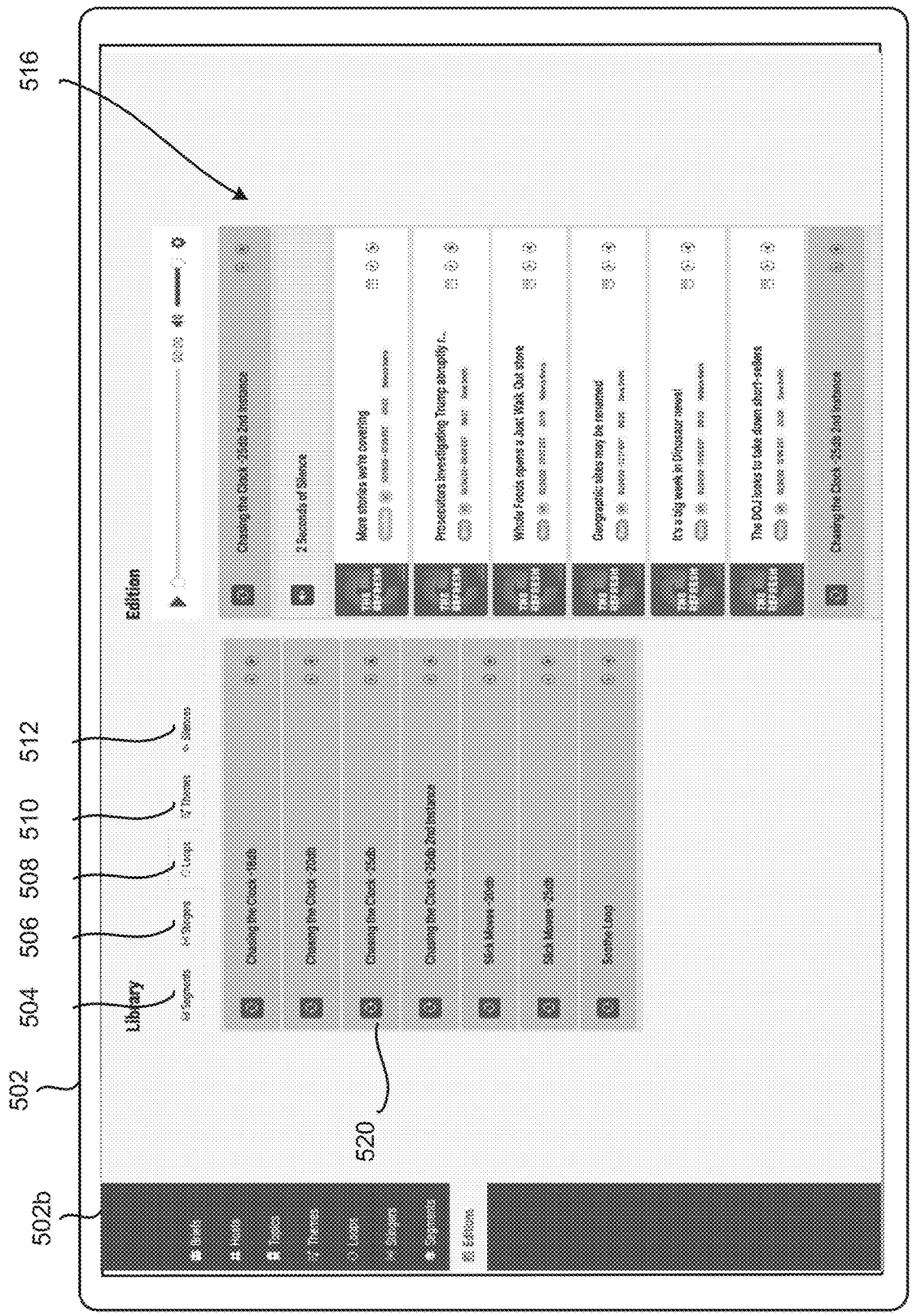
FIG. 5B illustrates a GUI during some embodiments of the method of automatic media content layering, in accordance with some embodiments of the present disclosure.
Figure 5C:
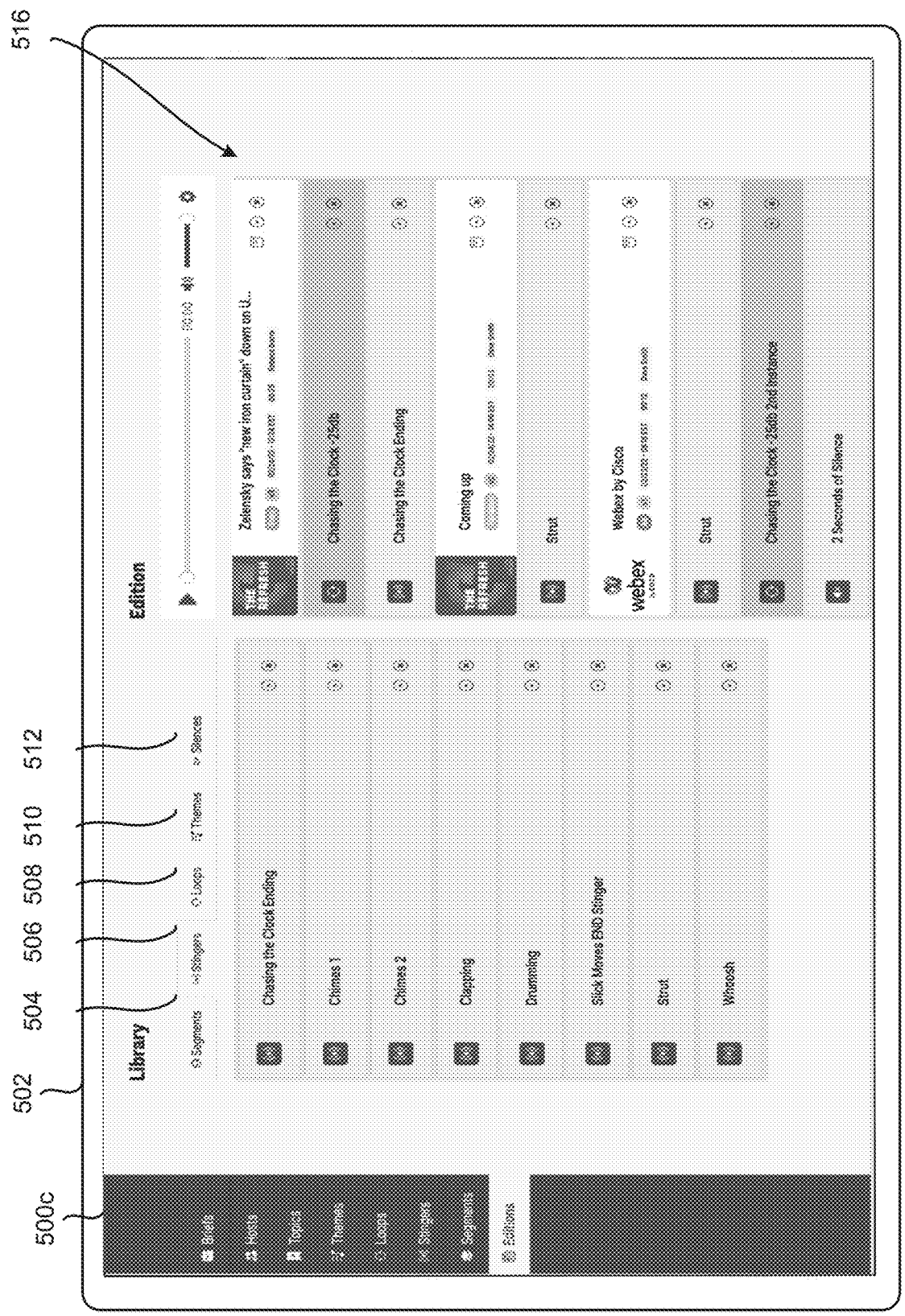
FIG. 5C illustrates a GUI during some embodiments of the method of automatic media content layering, in accordance with some embodiments of the present disclosure.
Figure 5D:
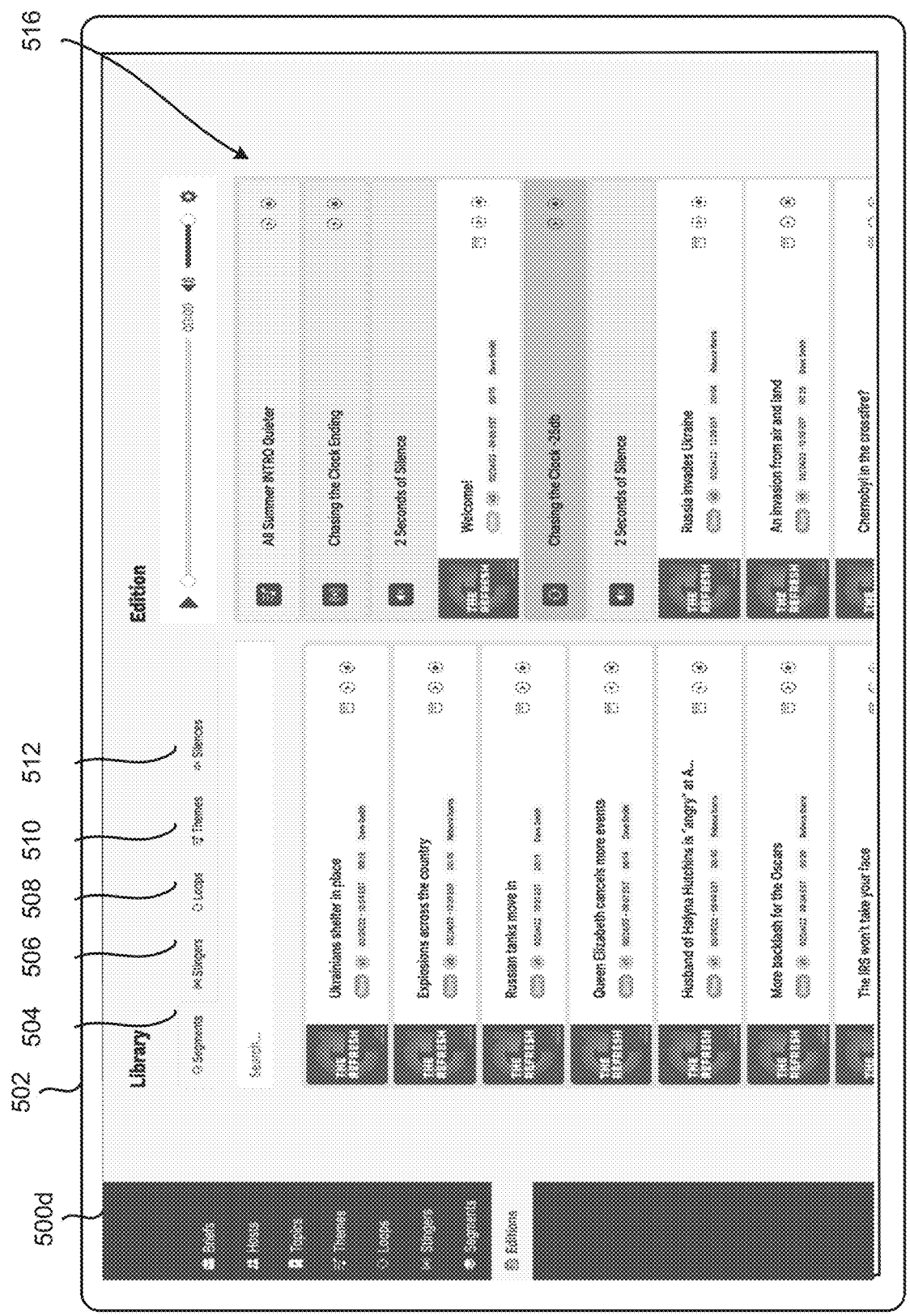
FIG. 5D illustrates a GUI during some embodiments of the method of automatic media content layering, in accordance with some embodiments of the present disclosure.

FIG. 5A specifically illustrates the themes sub-library 510 being selected that includes a plurality of themes. A theme media content segment GUI element 518 may have been selected and provided to the media content list GUI element 516. FIG. 5B illustrates the loop sub-library 508 being selected such that loop media content segment GUI elements 520 may be selected for the media content list GUI element 516. FIG. 5C illustrates the stinger sub-library 506 being selected such that stinger media content segment GUI elements 522 may be selected for the media content list GUI element 516. FIG. 5D illustrates the content portion sub-library 504 being selected that may include the content portion media content segment GUI elements 514*a*-514*e* for the media content list GUI element 516.

In FIG. 5A, the theme media content segment GUI element 518 may have been positioned first in the media content list GUI element 516, followed by a stinger media content segment GUI element 522, followed by a silence media content segment GUI element 524, followed by the content portion media content segment GUI element 514*a*, followed by a loop media content segment GUI element 520, followed by the silence media content segment GUI element 524, and followed by the content portion media content segment GUI elements 514*b*-514*e*. While not illustrated, the media content list GUI element 516 may include a subsequent loop media content segment GUI element after the content portion media content segment GUI element 514*e*, which ends the loop started by the first loop media content segment GUI element 520. Once completed, the media content list is generated from the order of the media content segment GUI elements in the media content list GUI element 516. The media content list may include a media content segment entry according to the order of the media content segment GUI elements 514*a-e*, 518, 520, 522, and 524 in the media content list GUI element 516.

The method 400 may proceed to block 404 where media content tracks are determined from the media content segment entries. In an embodiment, at block 404, the media content layering controller 304 may determine a plurality of media content tracks based on the media content segment entries included in the media content list. The media content layering controller 304 may determine the number of tracks which may be based on the order of the media content segment entries or the type of the media content segment entries in the media content list. In one example, a first media content track may be determined based on the at least one first type media content segment entry and a second media content track may be determined based on the at least one second type audio content segment entry. In some embodiments, a third type media content segment entry may be associated with its own track or at least one of the first media content track or the second media content track. In other examples, each entry of the third type media content segment entry (or any of the first type media content segment entries or the second type media content segment entries) may be associated with its own separate track. Specifically, if there is a first third type media content segment entry and a second third type media content segment entry, the first third type media content segment entry may be determined to be included on a third track and the second third type media content segment entry may be determined to be included on a fourth track.

The order of the different type media content segments entries may also affect the number of media content tracks or which media content track that the media content segment is placed. For example, if a third type media content segment entry is after a first type media content segment entry in the media content list, then this may result in a different number of media content tracks or a different media content track that the third type media content segment is associated with than if the third type media content segment entry is after a second type media content segment entry. In various embodiments, the order of media content segments within a track may be determined based on the order of the respective media content segment entries in the media content list.

The method 400 may proceed to block 406 where media content track features are determined. In an embodiment, at block 406, the media content layering controller 304 may determine features for each media content track. Different features of the media content tracks may be determined from the media content list. For example, the features may include a duration of each media content track, a duration of each media content segment within the media content track, an order of media content segments within the media content track, the starting or stopping of the media content tracks in relation to other media content tracks (e.g., a playback timing) or other features of the media content tracks that would be apparent to one of skill in the art in possession the present disclosure.

With reference to the example media content lists of FIGS. 5A-5D, examples of determinations made by the media content layering controller 304 in blocks 404 and 406 are illustrated. The order of the media content segment GUI elements 514a-514e, 518, 520, 522, and 524 and the sub-libraries from which those media content segment GUI elements were provided may determine the media content tracks in the layered media content object. For example, the loop media content segments from the loop sub-library 508 may be provided on its own track or each loop pair may be a separate track such that there is a plurality of loop tracks layered in a final layered media content object if there are multiple loop pairs in the media content list GUI element 516. The content portion media content segments from the content portion sub-library 504, the stinger media content segments from the stinger sub-library 506, and the silence media content segments from the silences sub-library 512 may be provided on a common track. The theme media content segments from the theme sub-library 510 may be provided on its own track with other themes. Each theme may be provided on its own track, or a first set of themes may be included on a first track while a second set of themes may be included on a second track. While certain media content track libraries are described on being included on the same track or different tracks, the user may select an option to change which track each library is on or if it is on a separate track. Furthermore, there may be options for a user to individually select which media content track a media content segment (e.g., content portion media content segment, a loop media content segment, a stinger media content segment, a theme media content segment, or a silence media content segment) should be provided on.

The method 400 may proceed to block 408 where a media content layered object is generated based on the media content track features and the determined media content tracks such that the media content layered object includes a plurality of tracks so that when the media content layered object is played, at least a portion of the first media content track is played concurrently with the second media content track. In an embodiment, at block 408, the media content layering controller may generate the media content layered object. The media content layered object may include a plurality of media content tracks that are layered and created according the media content track features of block 406 and the media content tracks determined in block 404. At least a portion of a first media content track may be layered with at least a portion of a second media content track. As such, the "layered" media content tracks may result in a single, effective sound for a given time when the media content layered object is played.

Figure 6:
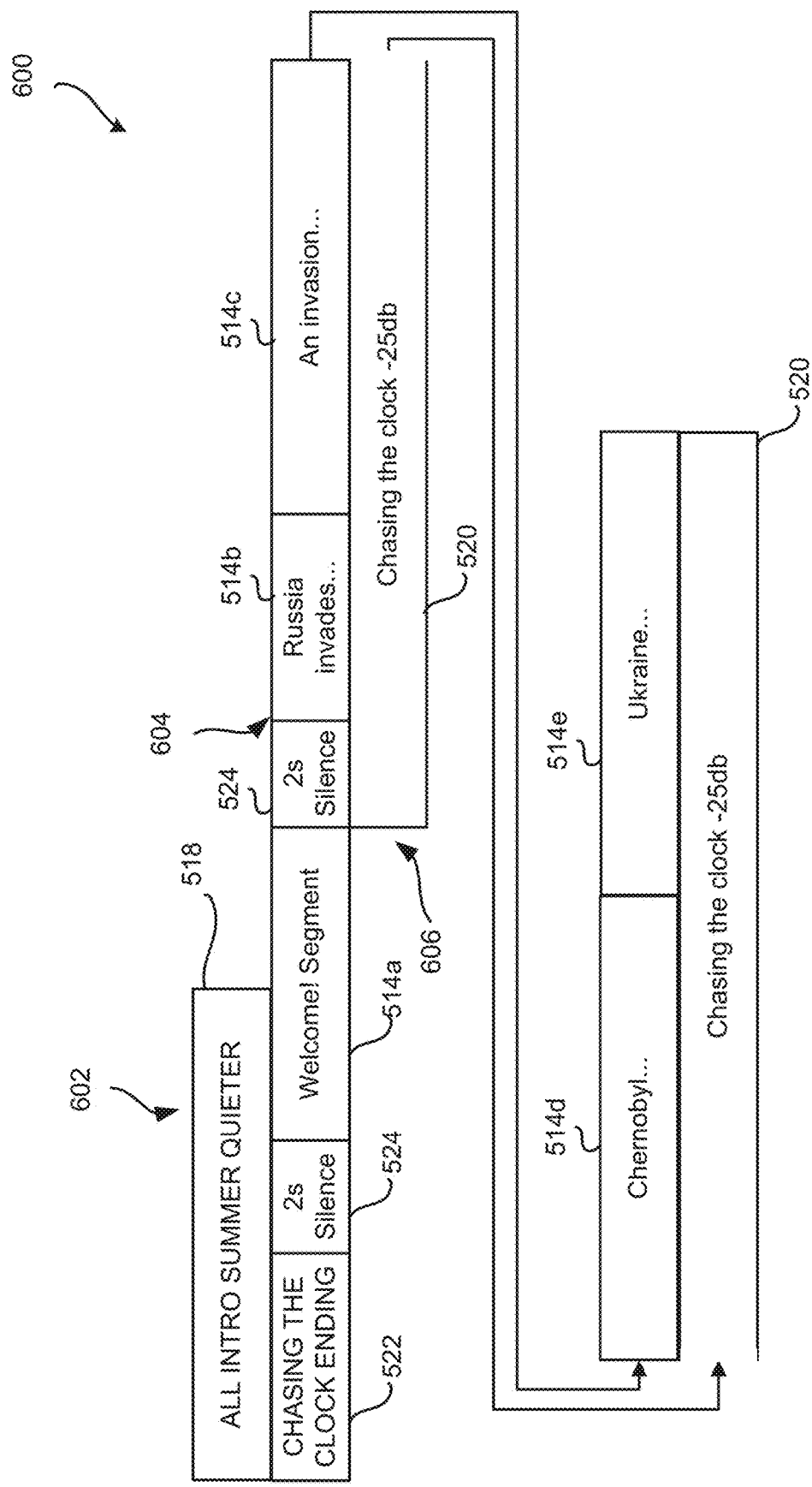
FIG. 6 illustrates a timing diagram of the media content list of FIG. 5A after the automatic media content layering of the method of FIG. 4, in accordance with some embodiments of the present disclosure.

FIG. 6 illustrates a timing diagram of a resulting media content layered object 600 from the media content list GUI element 516 of FIG. 5A. As can be seen from FIG. 6, the media content associated with the theme media content segment GUI element 518 is on a media content track 602, the media content segments associated with the stinger media content segment GUI element 522, the first silence media content segment GUI element 524, the content portion media content segment GUI element 514a, the second silence media content segment GUI element 524, and the content portion media content segment GUI elements 514b-514e are on a media content track 604. The media content segment associated with the loop media content segment GUI element 520 is on a media content track 606.

The positioning of the media content segment GUI elements 514a-514e, 518, 520, 522, and 524 may result in the specific media content layered object 600. For example, providing the loop media content segment GUI element 520 after the content portion media content segment GUI element 514a may cause the loop to start when the media content segment associated with the content portion media content segment GUI element 514a ends. The media content segment associated with the loop media content segment GUI element 520 may continue to play until the media content segment associated with the media content segment GUI element 514e ends because the second loop media content segment GUI element 520 is placed immediately after the content portion media content segment GUI element 514e. As such, the media content track 606 that includes the media content segment associated the content portion media content segment GUI element 514e expands to fit the length of the media content track 604. In other words, the timing of media content track 606 is associated with or based on the media content track 604.

The resulting media content layered object 600 may be generated from the defined media content segment GUI elements. For example, each media content track 602, 604, or 606 may include media content segments or files that include the same codec that may be concatenated by a demuxer that reads a list of files and other directives from a text file and demuxes them one after the other, as if all their packets had been muxed together. All files may have the same streams (same codecs, same time base, etc.) but can be wrapped in different container formats. Media content segments that include the same codec may also be concatenated using concat protocol. While the demuxer works at the stream level, the concat protocol works at the file level. Media files that do not include the same codec may be concatenated by a concat filter or using an external script. The resulting media content tracks 602, 604, and 606 may be merged or layered using a merging/layering algorithm included in the media content layering controller 304.

When the media content administrator is satisfied with the media content segments selected from each library and the order of the GUI elements are positioned, the administrator may select a generate object GUI element (not illustrated in FIGS. 5A-5D but may be included in those GUIs) to generate the media content object 600 that includes the media content associated with the media content segment GUI elements 514a-514e, 518, 520, 522, and 524. In some embodiments, the media content administrator may download the media content object by selecting a download media content object element.

While the media content layered object may be generated from the media content list GUI element 516, in other embodiments of the present disclosure, the media content administrator may generate, via the media content layering controller 304, media content object rules such that the media content layering controller 304 may create the media content layered object using the media content segments based on the media content object rules. These rules may be user specific such that rules consider user tracking information 308b or information from the user accounts 308c and media content segment information (e.g., topics, keywords, broadcaster identifier, or other information). As such, a personalized media content layered object may be generated for each user of the automatic media content layering system 100 using the media content segments 308d provided by media content administrator of the user computing device 102a or other media content segments that were provided by other media content administrators. Furthermore, each personalized media content object may have a different selection of the media content segments or a different ordering of the media content segments.

The media content layering controller 304 may provide the media content layered object to one or more user computing devices. For example, the media content layering controller 304 may provide the media content layered object to the user computing device 102b that is associated with a user. The user may consume, partially consume (e.g., consume a portion of the media content segments), or not consume the media content layered object. In various embodiments, a user GUI may be generated that corresponds with the media content layered object. For example, the user GUI may include the media content segment GUI elements 514a-514e, 518, 520, 522, or 524 and respective media content segment information included on those content segment GUI elements. The graphical user interface may be provided for display at the user computing device 102b.

The method 400 may then proceed to block 410 where an action is performed with the media content layered object. In an embodiment, at block 410, the media content layering controller 304 may perform one or more actions with the media content layered object. For example, the media content layering controller 304 may store the media content layered object in the media content object library 308f. In another example, the media content layering controller 304 may provide the media content layered object to the user computing device 102a or 102b via the network 108 for storage. In another example, the media content layering controller 304 may play the media content layered object and stream the media played to the user computing device 102a or 102b. While specific actions performed with the media content layered object are discussed herein, one of skill in the art in possession of the present disclosure will recognize that other actions may be performed with the media content layered object and still fall under the scope of the present disclosure.

Thus, the systems and methods of the present disclosure provide an automatic media content layering system that may automatically layer media content based on GUI positions and the types of media content that are involved. As such, the systems and methods of the present disclosure reduce memory, processing, and network resources by segmenting media content and automatically layering those media content segments based on a type of media content segment that the media content segments are generated.

Figure 7:
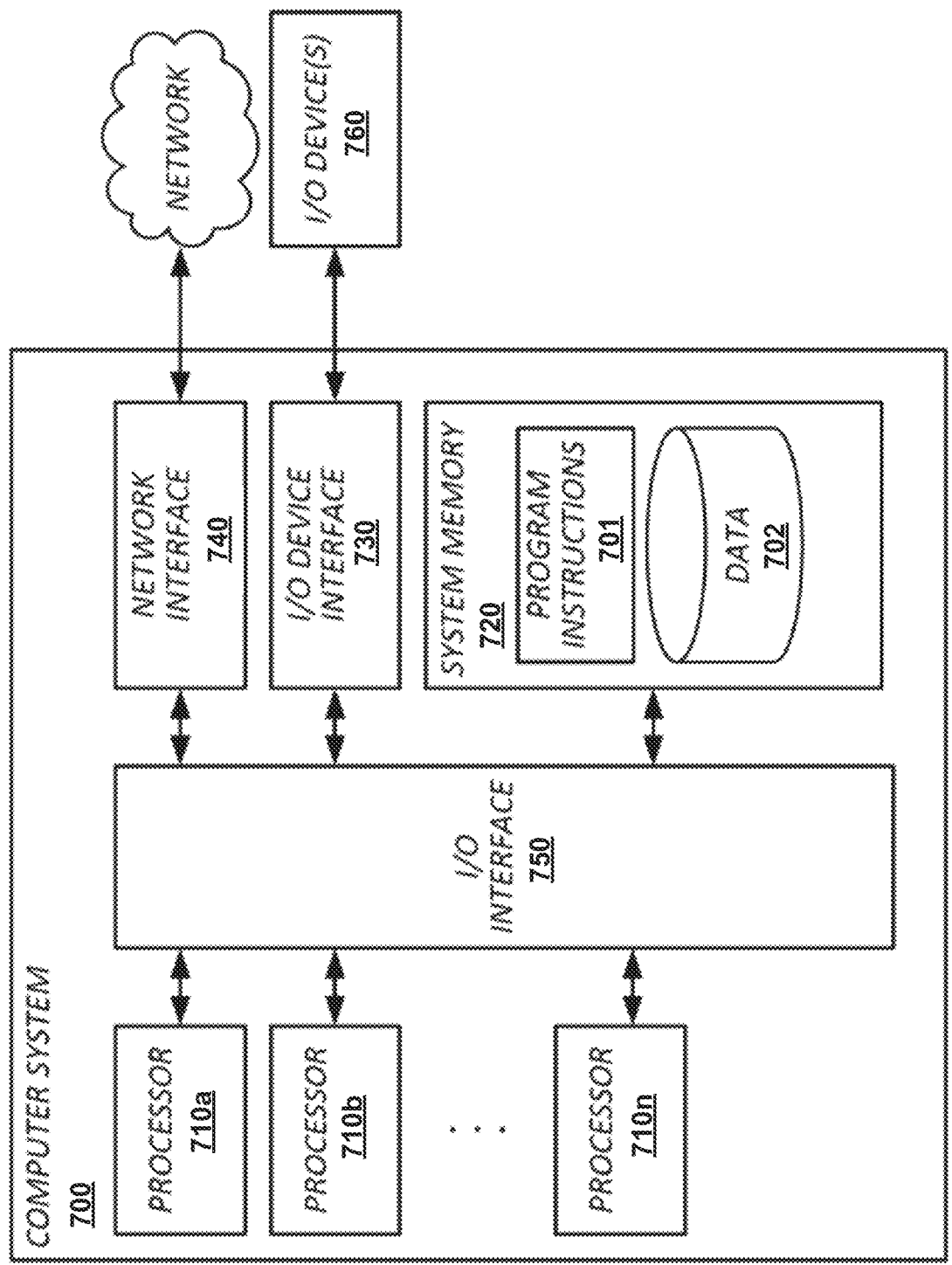
FIG. 7 is a block diagram of an example of a computing system with which the present techniques may be implemented, in accordance with some embodiments of the present disclosure.

FIG. 7 is a diagram that illustrates an exemplary computing system 700 in accordance with embodiments of the present technique. The user computing devices 102a, 102b, and 200 and the content provider computing devices 104 and 300, discussed above, may be provided by the computing system 700. Various portions of systems and methods described herein, may include or be executed on one or more computing systems similar to computing system 700. Further, processes and modules described herein may be executed by one or more processing systems similar to that of computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computing systems) to implement various processing functions.

I/O device interface 730 may provide an interface for connection of one or more I/O devices 760 to computing system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computing system 700 through a wired or wireless connection. I/O devices 760 may be connected to computing system 700 from a remote location. I/O devices 760 located on remote computing system, for example, may be connected to computing system 700 via a network and network interface 740.

Network interface 740 may include a network adapter that provides for connection of computing system 700 to a network. Network interface 740 may facilitate data exchange between computing system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 701 or data 702. Program instructions 701 may be executable by a processor (e.g., one or more of processors 710a-710n) to implement one or more embodiments of the present techniques. Instructions 701 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 750 may be configured to coordinate I/O traffic between processors 710a-710n, system memory 720, network interface 740, I/O devices 760, or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 700 or multiple computing systems 700 configured to host different portions or instances of embodiments. Multiple computing systems 700 may provide for parallel or sequential processing/execution of one or more portions of the techniques described herein.

Those skilled in the art will appreciate that computing system 700 is merely illustrative and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 700 may be transmitted to computing system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: obtaining, by a computer system, a media content list that includes at least one first type audio content segment entry and at least one second type audio content segment entry, wherein each of the at least one first type audio content segment entries is associated with a respective first type audio content segment and each of the at least one second type audio content segment entries is associated with a respective second type audio content segment; determining, by the computer system, a first audio content track based on the at least one first type audio content segment entry and a second audio content track based on the at least one second type audio content segment entry; determining, by the computer system, media content track features of the first audio content track and the second audio content track based on an order of the at least one first type audio content segment entry and the at least one second type audio content segment entry in the media content list; generating, by the computer system, a media content layered object based on the media content track features and the first audio content track and the second audio content track, wherein the media content layered object includes the first audio content track and the second audio content track such that when the media content layered object is played, at least a portion of the first audio content track is played concurrently with the second audio content track; and storing, by the computer system, the media content layered object in a storage system.

2. The medium of embodiment 1, wherein the operations further comprise: providing, by the computer system, the media content layered object to at least a first portion of a set of user computing devices.

3. The medium of any one of embodiments 1-2, wherein the media content list includes at least one third type audio content segment entry that is associated with the first audio content track, wherein each of the at least one third type audio content segment entries is associated with a respective third type audio content segment, wherein the operations further comprise: determining, by the computer system, the first audio content track based on an order of the at least one first type audio content segment entry and the at least one third type audio content segment entry in the media content list.

4. The medium of any one of embodiments 1-3, wherein the media content list includes at least one third type audio content segment entry that is associated with a third audio content track, wherein each of the third type audio content segment entries is associated with a respective third type audio content segment, wherein the operations further comprise: determining a third audio content track based on an order of the at least one third type audio content segment entry in the media content list; wherein the media content track features include third media content features for the third audio content track, and wherein the media content layered object includes the third audio content track such that when the media content layered object is played, at least a portion of the third audio content track is played concurrently with the first audio content track or the second audio content track.

5. The medium of any one of embodiments 1-4, wherein the operations further comprise: determining, by the computer system, a duration of at least one of the respective second type audio content segments of the second audio content track based on a duration of at least one of the respective first type audio content segments of the first audio content track; and extending or shortening the at least one of the respective second type audio content segments according to the duration determined for the at least one of the respective second type audio content segments.

6. The medium of any one of embodiments 1-5, wherein the operations further comprise: playing the media content layered object via a user input/output (I/O) device.

7. The medium of any one of embodiments 1-6, wherein the first audio content track or the second audio content track are determined based on the order of the at least one first type audio content segment entry and the at least one second type audio content segment entry in the media content list.

8. The medium of any one of embodiments 1-7, wherein the determination of the first audio content track includes: concatenating a plurality of first type audio content segments associated with the first audio content track based on the order of those first type audio content segments in the media content list.

9. The medium of any one of embodiments 1-8, wherein the operations comprise steps for: determining the first audio content track and the second audio content track.

10. The medium of claim 1, wherein the operations comprise steps for: generating the media content layered object.

11. A method including any one of the above-mentioned embodiments 1-10.

12. A system, including: one or more processors; and memory storing instructions that when executed by the processors cause the processors to effectuate operations of the above-mentioned embodiments 1-10.

What is claimed is:

1. A non-transitory, machine-readable medium storing instructions that, when executed by one or more processors, effectuate operations comprising:
obtaining, by a computer system, a media content list that includes at least one first type audio content segment entry and at least one second type audio content segment entry, wherein each of the at least one first type audio content segment entry is associated with a respective first type audio content segment and each of the at least one second type audio content segment entry is associated with a respective second type audio content segment;
determining, by the computer system, a first audio content track based on the at least one first type audio content segment entry and a second audio content track based on the at least one second type audio content segment entry;
determining, by the computer system, media content track features of the first audio content track and the second audio content track based on an order of the at least one first type audio content segment entry and the at least one second type audio content segment entry in the media content list;
generating, by the computer system, a media content layered object based on the media content track features and the first audio content track and the second audio content track, wherein the media content layered object includes the first audio content track and the second audio content track such that when the media content layered object is played, at least a portion of the first audio content track is played concurrently with the second audio content track; and
storing, by the computer system, the media content layered object in a storage system.

2. The medium of claim 1, wherein the operations further comprise:
providing, by the computer system, the media content layered object to at least a first portion of a set of user computing devices.

3. The medium of claim 1, wherein the media content list includes at least one third type audio content segment entry that is associated with the first audio content track, wherein each of the at least one third type audio content segment entry is associated with a respective third type audio content segment, wherein the operations further comprise:
determining, by the computer system, the first audio content track based on an order of the at least one first type audio content segment entry and the at least one third type audio content segment entry in the media content list.

4. The medium of claim 1, wherein the media content list includes at least one third type audio content segment entry that is associated with a third audio content track, wherein each of the at least one third type audio content segment entry is associated with a respective third type audio content segment, wherein the operations further comprise:
determining the third audio content track based on an order of the at least one third type audio content segment entry in the media content list;
wherein the media content track features include third media content features for the third audio content track, and wherein the media content layered object includes the third audio content track such that when the media content layered object is played, at least a portion of the third audio content track is played concurrently with the first audio content track or the second audio content track.

5. The medium of claim 1, wherein the operations further comprise:
determining, by the computer system, a duration of at least one of the respective second type audio content segments of the second audio content track based on a duration of at least one of the respective first type audio content segments of the first audio content track; and
extending or shortening the at least one of the respective second type audio content segments according to the duration determined for the at least one of the respective second type audio content segments.

6. The medium of claim 1, wherein the operations further comprise:
playing the media content layered object via a user input/output (I/O) device.

7. The medium of claim 1, wherein the first audio content track or the second audio content track are determined based on the order of the at least one first type audio content segment entry and the at least one second type audio content segment entry in the media content list.

8. The medium of claim 1, wherein the determination of the first audio content track includes: concatenating a plurality of first type audio content segments associated with the first audio content track based on the order of those first type audio content segments in the media content list.

9. The medium of claim 1, wherein the operations comprise steps for:
determining the first audio content track and the second audio content track.

10. The medium of claim 1, wherein the operations comprise steps for:
generating the media content layered object.

11. A method of automatic media content layering, comprising:
obtaining, by a computer system, a media content list that includes at least one first type media content segment entry and at least one second type media content segment entry, wherein each of the at least one first type media content segment entry is associated with a respective first type media content segment and each of the at least one second type media content segment entry is associated with a respective second type media content segment;
determining, by the computer system, a first media content track based on the at least one first type media content segment entry and a second media content track based on the at least one second type media content segment entry;
determining, by the computer system, media content track features of the first media content track and the second media content track based on an order of the at least one first type media content segment entry and the at least one second type media content segment entry in the media content list;
generating, by the computer system, a media content layered object based on the media content track features and the determined first media content track and the second media content track, wherein the media content layered object includes the first media content track and the second media content track such that when the media content layered object is played, at least a portion of the first media content track is played concurrently with the second media content track; and storing, by the computer system, the media content layered object in a storage system.

12. The method of claim 11, further comprising:
providing, by the computer system, the media content layered object to at least a first portion of a set of user computing devices.

13. The method of claim 11, wherein the media content list includes at least one third type media content segment entry that is associated with the first media content track, wherein each of the at least one third type media content segment entry is associated with a respective third type media content segment, wherein the method further comprises:

determining, by the computer system, the first media content track based on an order of the at least one first type media content segment entry and the at least one third type media content segment entry in the media content list.

14. The method of claim 11, wherein the media content list includes at least one third type media content segment entry that is associated with a third media content track, wherein each of the at least one third type media content segment entry is associated with a respective third type media content segment, wherein the method further comprises:

determining the third media content track based on an order of the at least one third type media content segment entry in the media content list;

wherein the media content track features include third media content features for the third media content track, and wherein the media content layered object includes the third media content track such that when the media content layered object is played, at least a portion of the third media content track is played concurrently with the first media content track or the second media content track.

15. The method of claim 11, further comprising:
determining, by the computer system, a duration of at least one of the respective second type media content segments of the second media content track based on a duration of at least one of the respective first type media content segments of the first media content track; and extending or shortening the at least one of the respective second type media content segments according to the duration determined for the at least one of the respective second type media content segments.

16. The method of claim 11, further comprising:
playing the media content layered object via a user input/output (I/O) device.

17. The method of claim 11, wherein the first media content track or the second media content track are determined based on the order of the at least one first type media content segment entry and the at least one second type media content segment entry in the media content list.

18. The method of claim 11, wherein the determination of the first media content track includes: concatenating a plurality of first type media content segments associated with the first media content track based on the order of those first type media content segments in the media content list.

19. The method of claim 11, further comprising steps for:
determining the first media content track and the second media content track.

20. The method of claim 11, further comprising steps for:
generating the media content layered object.

* * * * *